2,475,365

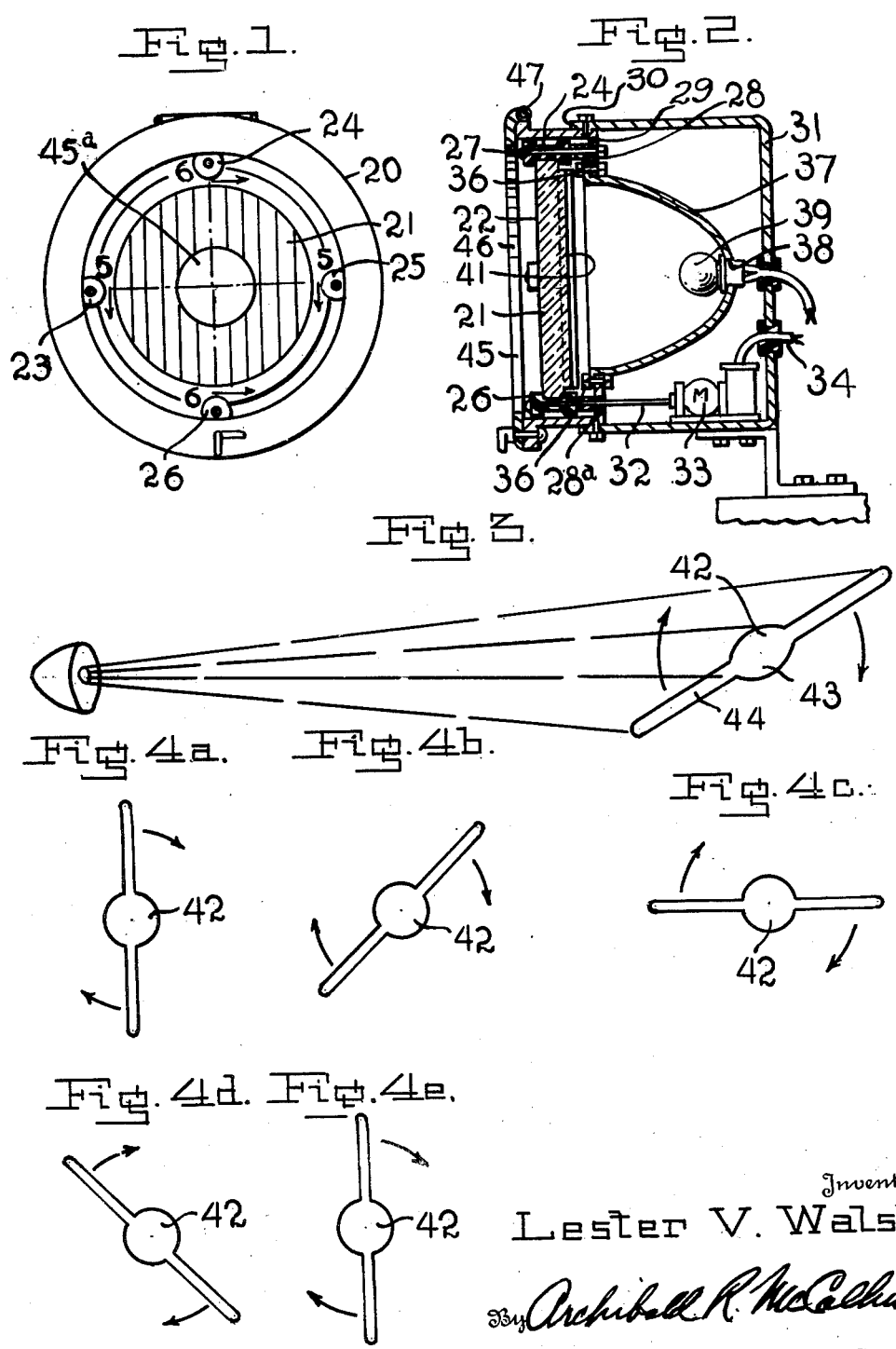
July 5, 1949.  L. V. WALSH  2,475,365
WARNING SIGNAL LIGHT
Filed July 7, 1944  2 Sheets-Sheet 1
Inventor
Lester V. Walsh
By Archibald R. McCallum
Attorney July 5, 1949.  L. V. WALSH  2,475,365
WARNING SIGNAL LIGHT
Filed July 7, 1944  2 Sheets-Sheet 2
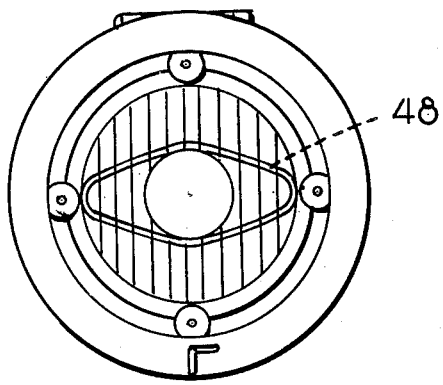
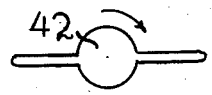
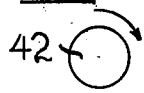
Inventor
Lester V. Walsh
By Archibald R. McCallum
Attorney Patented July 5, 1949

UNITED STATES PATENT OFFICE 2,475,365

WARNING SIGNAL LIGHT

Lester V. Walsh, Chicago, Ill.

Application July 7, 1944, Serial No. 543,940

3 Claims. (Cl. 177—329)

My invention relates to lamp structures and, more particularly, to lamp structures for projecting controlled movable light beams at a substantial distance from the light source and over a wide range to provide a blinking and flashing effect as a warning signal upon the eyes of an observer positioned within the periphery of the beams.

In the art of vehicle signalling, it has been a practice in some instances to provide a lantern on the front of locomotives, which lantern includes mechanical means for shifting the light source or the reflector laterally. Some difficulty has been encountered heretofore in that the mechanism for shifting the light source has been relatively complicated or difficult to control as to alignment, the characteristic pattern of the prior signal lights requiring accurate adjustment usually difficult of maintenance. Hence, absolute control of a beam of light normally has been impossible. In addition, the prior lights have not included facility for maintaining the light on any one fixed object in the right-of-way. In instances where the old shiftable light moved in the pattern of a figure-8 there was a large amount of the desired warning effect lost.

It is primarily an object of the present invention to provide for vehicles a warning signal lamp which will be simple in design, reliable in operation and economical of manufacture.

It is another object of my invention to provide a signal lamp which will be effective to create a moving beam of light without requiring shifting of the light source, thereby enabling simplicity of construction and less likelihood of maladjustment.

It is another object of my invention to provide a signal lamp for vehicles which will include facility for a relatively fixed beam for illuminating the right-of-way and a relatively movable beam for providing a flashing warning effect.

It is another object of my invention to provide a signal lantern for fixed or movable stations which will combine the functions of illuminating and providing a warning signal with a single light source.

It is another object of my invention to provide a signal lantern for a fixed or movable station which will include facility for directing a relatively fixed illuminating beam and a flashing beam effective only in a restricted diameter.

In one embodiment my novel construction will include a rotating or oscillating transparent or semi-transparent lens plate in front of the parabolic reflector, so as to produce a desired pattern of light. This pattern of light may include an elongated beam transverse to the main axis of the light unit, such as to merge with an axially fixed beam through a clear center portion of the lens plate. The parabolic reflector might be shaped further to restrict the configuration of the transverse portion of the beam.

Other features and advantages of this invention will more fully appear from the following detailed description, taken in connection with the accompanying drawings, in which—

Fig. 1 is a front elevation of the warning signal lantern constituting one embodiment of the invention;

Fig. 2 is a vertical section through the lantern of Fig. 1;

Fig. 3 is a schematic view showing the light beam projected by the lantern of Fig. 1 cut through to illustrate the revolving flash effect;

Fig. 4a, b, c, d and e, are schematic views showing the movement of the revolving light beam in rotating through 180°.

Fig. 5 shows schematically a section on the line 5—5 of Fig. 1;

Fig. 6 shows schematically a section on the line 6—6 of Fig. 1;

Figs. 7 and 8 show other types of lens plates to produce the same effect;

Fig. 9 shows a modified form of reflector, and

Figs. 10a, b, c, d and e show the beam changes as it turns through 180° with the lens before the reflector of Fig. 9.

For the sake of clearness and simplicity in the drawings the apparatus is shown schematically and at times fragmentarily, since a full understanding of the invention may be had without further explanation.

Referring to the drawings wherein identical parts are indicated by similar reference numbers throughout the several views, a preferred embodiment of the invention includes a lantern 20 for securing on any vehicle such as a locomotive, emergency vehicles such as fire engines, police cars and ambulances, although it will be understood that the lantern 20 may be provided with any movable or fixed station, such as a warning station at roadside or right-of-way points. At the front of lantern 20 is mounted a circular lens plate 21, having a forward plane surface 22 and mounted on drive rollers including guide rollers 23, 24 and 25, and driven roller 26. The guide rollers are mounted on respective shafts 27, 27 each having suitable bearings 28 in circular flange 29 affixed to the front 30 of lantern body 31; and driven roller 26 is fast on drive shaft 32 rotatable in lower bearing 28a.

On the inner surface of casing 31 is secured motor 33 provided with conductor cord 34 suitably connected with any source of power and control switch not shown. Forward of motor 33, flange 29 carries spaced supports 36, 36 for maintaining parabolic reflector 37 in position. Reflector 37 has an axial recess 38 for a fixed bulb or light source 39 suitably connected to any source of power.

In conjunction with the above described means for rotating and illumining lens 21, an important aspect of the invention includes a rearward configurated surface 41 thereon. By referring to Fig. 3, a schematic representation of the special signal beam 42 may be observed, as cut through the axial beam or bull's-eye portion 43, being flanked with merging radial wing portions 44. It will be understood that the shape of beam 42 is determined by the rearward configuration of lens 21, a central clear portion 45a forming the axial bull's-eye beam 43 and the surrounding configurated area 45b serving to produce the contiguous radial wing portions 44 of the beam.

The operation of the signal lantern and the novel signalling beam produced thereby may be observed by reference to the drawing, particularly Figs. 4a, b, c, d and e. When the lens is in the position as shown in Fig. 1, the projected beam 42 is as shown in Fig. 4a with the central beam and contiguous radial wing portions assuming the vertical aspect. Fig. 4b shows the appearance of said beam after a clock-wise rotation of 45°, Fig. 4c shows the beam after a clock-wise rotation of 90°, Fig. 4d shows the beam after a clock-wise rotation of 135° and Fig. 4e shows the beam after its clock-wise rotation through 180°.

From a consideration of such views, it will be apparent that the beam does not change its shape during rotation but turns because the lens is turned by the driving mechanism, so that with the beam turned so as to maintain its axis in the direction of travel of a vehicle, the illumination of the path of the vehicle is not altered during rotation. However, the radial wing portions of the beam swinging around the bull's-eye beam as an axis causes a flashing effect in the area on opposite sides of the right-of-way.

The lantern 20 is provided forwardly with a guard rim 46 hinged at 47 to facilitate access to the interior of the lantern.

When it is desired to modify the shape of the signal beam during its rotation, the modified form of the invention shown in Fig. 9 may be employed. Therein it will be observed that the structure is identical with that shown in the primary embodiment with the exception that a somewhat flattened reflector 48 is employed in lieu of reflector 37. Flattened reflector 48 has the effect of permitting the full extent of the radial wing portions of the beam to be effective when the lens rotates so as to cast the beam in the horizontal.

By referring to Figs. 10a, b, c, d and e it will be apparent that when the lens is in the position shown in Fig. 9, the flattened top and bottom portions of the reflector serve to extinguish or cut off the radial wing portions of the beam. Fig. 10a shows only the bull's-eye portion. Fig. 10b shows the beam after having rotated clock-wise 45° from the position shown in Fig. 10a, and the radial wing portions still largely extinguished by the flattened reflector 48. However, Fig. 10c shows the beam rotated clock-wise through 90° and the full horizontal expanse of the transverse beam permitted to be effective. Figs. 10d and 10e show the intermittent obscuring of the radial wing portions of the beam by the clock-wise rotation through 135° and 180° respectively. It will be apparent that the effect of the modified form is to render the wing portions of the beam truly intermittent, where desired.

It is within the contemplation of the present invention to secure the result illustrated schematically in connection with the primary embodiment of the invention by utilizing a compressed reflector with a plain face lens. However, in order to arrive at this effect it will merely be necessary to rotate the reflector before the clear stationary lens.

From the foregoing it will be observed that the structures are exceptionally durable and efficient in their simplicity, there being practically no possibility of the driving mechanism to get out of order, and there being no necessity for accurate alignment of parts. The provision of the rotary lens in the organization described enables the maintenance of the full illumination by means of the clear bull's-eye portion while effective flashing signals due to the movement of the wing portions of the beam continue.

The clear section 45a shown in Figs. 5 and 6 is centered on the lens plate in order to insure its maintenance axially during rotation. It will be understood that it will be within the invention to place a clear or bull's-eye section of the lens off center in order to insure movement of the bull's-eye beam where desired. The invention is not to be limited to particular rearward configuration of the lens as shown in Figs. 5 and 6 inasmuch as various lens configurations may be utilized to provide the same effect, such as shown in Figs. 7 and 8, for example.

The structure is a simple one for the desired purpose of its utilization, and its general scope may be varied in many ways without departing from the spirit of the invention.

What I claim is:

1. A visible signal of the type described, comprising a reflective parabolic type lamp housing including a source of illumination and an opening through which a beam of said source is reflected, a transparent lens disposed in a plane adjacent said opening normal to said beam through which the latter is transmitted, said lens having a prismatic conformation adapted to bend at least a portion of said beam uniformly and at an angle to the axis of the beam in the form of a concentrated linear ray intersecting the axis of the beam, and means for producing 360° rotation of said lens in its plane to thereby carry said ray about the axis of the beam in uniformly varying positions ranging from perpendicular to horizontal to produce an alternate blinking and flashing effect on an observer within the field of projection of said beam.

2. A warning signal light having a parabolic reflector, a frontal body portion recessed to receive a lens and a rotatable support element for said lens, support elements in said recess, and a substantially transparent lens rotatably carried on said elements, said lens having an axial bull's-eye portion with prism portions extending diametrically of said lens, said axial bull's-eye portion serving continuously to illuminate a predetermined area and said prism portions for bending light rays to provide wings of relatively concentrated light to a contiguous area intermittently with a beam of light of greater concentration than that of said bull's-eye portion, and means for producing 360° rotation of said lens in its plane to thereby carry the wings of concentrated light around the axis of the area illuminated by the bull's-eye portion in uniformly varying positions ranging from perpendicular to horizontal to produce an intensified flashing and blinking effect upon an observer positioned within the path of said wing portion.

3. A warning signal light having a parabolic reflector, a frontal body portion recessed to receive a lens and a rotatable support element for said lens, support elements in said recess, and a substantially transparent prismatic lens rotatably carried on said elements, said lens having an axial bull's-eye portion with a plurality of opposed concave prisms extending diametrically of said lens which are identical in cross section extending throughout the remainder of said lens, said axial bull's-eye portion serving continuously to illuminate a predetermined area and said prisms uniformly bending light rays to provide wings in the form of beams of relatively concentrated light to intermittently illuminate a contiguous area, and means for producing 360° rotation of said lens in its plane to thereby carry the wings of concentrated light around the axis of the area illuminated by the bull's-eye portion in uniformly varying positions ranging from perpendicular to horizontal to provide an intensified flashing and blinking effect upon an observer positioned within the path of said wing portion.

LESTER V. WALSH.

REFERENCES CITED

The following references are of record in the file of this patent:

UNITED STATES PATENTS

| Number | Name | Date |
|---|---|---|
| 1,078,823 | Broadbent et al. | Nov. 18, 1913 |
| 1,175,420 | Ford et al. | Mar. 14, 1916 |
| 1,315,168 | Smith | Sept. 2, 1919 |
| 1,460,834 | Arbuckle | July 3, 1923 |
| 1,869,276 | Precourt | July 26, 1932 |
| 2,159,636 | Robert | May 23, 1939 |